(12) United States Patent
Beebe et al.

(10) Patent No.: US 7,379,905 B2
(45) Date of Patent: May 27, 2008

(54) AUTOMATED DATA WAREHOUSE FOR DEMAND FULFILLMENT SYSTEM

(75) Inventors: Melissa D. Beebe, Cedar Park, TX (US); Heather L. Fenner, Pflugerville, TX (US); Kevin T. Jones, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 820 days.

(21) Appl. No.: 09/847,244

(22) Filed: May 1, 2001

(65) Prior Publication Data

US 2002/0165804 A1 Nov. 7, 2002

(51) Int. Cl.
*G06Q 10/00* (2006.01)
(52) U.S. Cl. .......................................... 705/28; 705/22
(58) Field of Classification Search .................. 703/22, 703/7
See application file for complete search history.

(56) References Cited

U.S. PATENT DOCUMENTS

| | | | |
|---|---|---|---|
| 4,336,589 A | 6/1982 | Smith et al. ................. | 364/403 |
| 4,669,047 A | 5/1987 | Chucta ........................ | 364/468 |
| 5,040,123 A | 8/1991 | Barber et al. ................ | 364/468 |
| 5,193,065 A | 3/1993 | Guerindon et al. .......... | 364/468 |
| 5,450,317 A | 9/1995 | Lu et al. ...................... | 364/402 |
| 5,608,621 A | 3/1997 | Caveney et al. ............. | 395/216 |
| 5,712,989 A | 1/1998 | Johnson et al. .............. | 395/228 |
| 5,914,878 A * | 6/1999 | Yamamoto et al. .......... | 700/106 |
| 5,946,663 A | 8/1999 | Tanaka et al. ................. | 705/8 |
| 5,983,200 A * | 11/1999 | Slotznick ...................... | 705/26 |
| 5,991,732 A | 11/1999 | Moslares ....................... | 705/8 |
| 6,105,520 A | 8/2000 | Frazer et al. ................ | 112/117 |
| 6,144,945 A | 11/2000 | Garg et al. .................... | 705/28 |

FOREIGN PATENT DOCUMENTS

EP 0282697 A2 * 9/1988

OTHER PUBLICATIONS

Noori, Hamid; Production and Operations Management Total Quality and Responsiveness; 1995; McGraw-Hill, Inc pp. 422-601.*
Mukhopadhyay, Samar k; Optimal Scheduling of Just-in-time purchase deliveries; International Journal of Operations and Production Management; v15n9; pp. 59-69; 1995.*
Henry K. Graves, et al., *Inventory Management Method and Apparatus*, Published Aug. 4, 1998, United States Statutory Invention Registration No. H1743.

* cited by examiner

*Primary Examiner*—Elaine Gort
(74) *Attorney, Agent, or Firm*—Hamilton & Terrile, LLP; Stephen A. Terrile

(57) ABSTRACT

An automated data warehouse for a demand fulfillment system to provide current supply and demand for generating a work schedule and a material delivery schedule for manufacturing items built to customer order. The automated data warehouse includes outstanding customer orders for items as an accurate measure of current demand, and a current state of an available inventory of material for producing the items as an accurate measure of current supply. The automated data warehouse includes a continuously updated location of a quantity of material from the time the material is accepted into available inventory, during movements from one material source to another, throughout work-in-progress, until the time that the material is consumed. A work schedule and a material delivery schedule are generated periodically to keep up with consumption of materials and fulfillment of customer orders using the automated data warehouse as the source of current supply and demand.

24 Claims, 4 Drawing Sheets

AUTOMATED DATA WAREHOUSE FOR DEMAND FULFILLMENT SYSTEM

CROSS-REFERENCE TO RELATED APPLICATIONS

This application relates to application Ser. No. 09/774,396, filed on Jan. 31, 2001, entitled "Pull to Customer Order Demand Fulfillment System and Method" and naming as inventors David J. Lyon, Tomasz P. Wala, Mark R. Graban, Lee B. Beard, Kevin T. Jones, and Thomas J. Clark, the application being incorporated herein by reference in its entirety.

This application relates to application Ser. No. 09/774,330, filed on Jan. 31, 2001, entitled "Flexible Ordering of Inventory from Material Sources According to Material Requirements for Manufacturing Operations" and naming as inventors Kevin T. Jones, Melissa Beebe, and Shafali Rastogi, the application being incorporated herein by reference in its entirety.

This application related to application Ser. No. 09/847,444, filed on same day herewith, entitled "Closed Loop Demand Fulfillment System and Method" and naming as inventors Richard M. Anthony, Kevin T. Jones, Mark R. Graban, Stephen C. Cook, Edward P. Langan, David W. McGuire, and Shay D. Scott, the application being incorporated herein by reference in its entirety.

This application relates to application Ser. No. 09/773,102, filed on Jan. 31, 2001, entitled "Inventory and Order Management Tool" and naming as inventors Lisa S. Martin, Tracy A. Masson, Matthew S. Snyder, and Philip F. Mallory, the application being incorporated herein by reference in its entirety.

BACKGROUND OF THE INVENTION

1. Field of the Invention

The present invention relates generally to factory systems and, more particularly, to a closed loop demand fulfillment system for mass-producing build-to-customer-order items.

2. Description of the Related Art

Scheduling work in a manufacturing environment is a complex process. Most factories use an automated planning and scheduling system to ensure that customer demand is satisfied in a timely manner with minimum inventory. To achieve this goal, such planning requires that work for each manufacturing line is efficiently scheduled, that the appropriate materials needed to complete each task performed are available when needed on the manufacturing line, and that products are manufactured in the order that the products are needed. To produce a manufacturing schedule, customer orders must be received and analyzed, priorities must be assigned to items to be manufactured, manufacturing resources must be allocated, work must be scheduled, raw materials and/or parts must be obtained and delivered to the manufacturing line, work in progress must be tracked, and variability in availability of raw materials and/or parts must be handled. Many manufacturing facilities plan and manage these many tasks by combining multiple computerized planning and scheduling systems with paper-based management systems.

An example of a widely-used commercially available automated planning and scheduling system is i2 Technologies, Inc.'s Factory Planner and Rhythm Collaboration Planner. The i2 Factory Planner generates work schedules and material requirements schedules using customer-provided inputs of demand and inventory. The i2 Rhythm Collaboration Planner helps organizations to quote and promise order delivery to customers in real-time while obeying customer constraints on lot sizes, number of shipments, and time between shipments. The i2 Rhythm Collaboration Planner helps provide a global view of the entire supply chain from sourcing to delivery. These products handle the complicated scheduling for large, distributed, complex manufacturing environments. However, any automated planning and scheduling system can only produce accurate results if inputs to the system are accurate.

Most businesses schedule manufacturing activities based upon forecasts of demand for products. Work is typically scheduled on a daily or weekly basis to meet demand predicted based on past sales. Inputs to the automated planning and scheduling system are demand forecasts.

To ensure that demand is satisfied, most factories maintain inventories of both parts and/or raw materials. Each type of inventory typically includes stock to accommodate the average usage rate and stock to meet variations in demand. However, maintaining high inventory levels does not necessarily guarantee that the right inventory is available when and where it is needed. A material delivery schedule is needed that delivers material to the manufacturing line prior to the time the material is needed during manufacturing.

Furthermore, due to limited space in most factories and the expense of maintaining warehouses of inventory, it is desirable to maintain only the minimum inventory necessary to meet demand. Some factories operate on a build-to-customer-order model where no product is manufactured unless it has been ordered by a customer. This model enables the factory to operate with minimal inventory of finished products, but does not address the inventories of materials.

In addition to minimizing material inventory, it is also desirable to minimize material handling to ensure that materials are delivered to the right location at the right time.

Problems with scheduling manufacturing activities are exacerbated in a mass production manufacturing environment for commodities that are built to customer orders. The term commodity is used herein to describe a mass-produced unspecialized product. In such an environment, the timeframes for manufacturing and delivery activities may be sub-hourly. Demand forecasts do not reliably predict material needs at this level, and schedules based upon demand forecasts become less and less accurate as time elapses between the time the work is scheduled and the time the work is initiated on the manufacturing line. Nor do demand forecasts respond to variations in material needs resulting from atypical customer orders. Scheduling based upon demand forecasts does not provide the responsiveness to changes in inventory and work schedules needed to ensure that materials are delivered to the right place at the right time.

A further problem in scheduling work and material deliveries for performing the work is that a current state of the available inventory, updated sufficiently often to keep up with consumption of material, is very difficult to obtain. Materials can reside in many locations, or material sources, within the factory. For example, the material may reside as part of work in progress at an operation on a manufacturing line, the material may reside in a stockroom, or the material may be in transit from one material source to another. The material may also be available from a supplier that is close enough so that the material could be used on the manufacturing line a few hours later.

Typically no automated system keeps track of the quantities of material available at all of these different locations. For example, an in-house inventory is typically tracked using an in-house inventory management system, whereas supplier inventory is tracked in the supplier's own inventory management system. Furthermore, materials residing in the factory but on a manufacturing line as part of work-in-progress are usually not considered to be sources of supply of materials for scheduling work and material deliveries. These work-in-progress materials are typically considered to be unavailable until they can be counted during a time period when manufacturing is halted, such as in an overnight batch process. Material in-transit from one material source to another is also typically excluded from a calculation of available supply of materials because it is difficult to determine the quantity of the material as they are moved in the time periods necessary for mass-producing items.

Even if each of the systems including all available inventory for all materials is maintained in real time, additional processing time is necessary to obtain the available inventory of all materials at all material sources and combine them to provide a current state of the available inventory of materials. As the work schedule and the material delivery schedule are being generated, material is being consumed and customer orders are being fulfilled. This additional processing time should be minimized to ensure that outstanding customer orders and the current state of the available inventory are as accurate as possible for generating the schedules when they are needed.

What is needed is an automated data warehouse for a demand fulfillment system for scheduling work and delivery of material for mass producing items in a factory based upon current supply and demand and continuously updating the current supply and demand. For example, the automated data warehouse would include outstanding customer orders for items as an accurate measure of current demand, and a current state of an available inventory of material for producing the items as an accurate measure of current supply. The automated data warehouse should include all customer orders as a source of demand from the time the customer order is received until the customer order is fulfilled. Similarly, the automated data warehouse should include a current snapshot of all material available to the factory, regardless of its location, to be used when producing a work schedule and a material delivery schedule. The automated data warehouse should enable current supply and demand to be determined while manufacturing is occurring in the factory, without the need to delay manufacturing or to wait until a lull when the customer orders and the available inventory are static. The automated data warehouse should enable generating a work schedule and a material delivery schedule as often as is necessary to keep up with consumption of materials and fulfillment of customer orders.

SUMMARY OF THE INVENTION

The present invention provides an automated data warehouse for a demand fulfillment system and method to provide current supply and demand for generating a work schedule and a material delivery schedule for manufacturing items, particularly commodities, built to customer order. The automated data warehouse includes outstanding customer orders for items as an accurate measure of current demand, and a current state of an available inventory of material for producing the items as an accurate measure of current supply. The automated data warehouse includes all customer orders as a source of demand from the time the customer order is received until the customer order is fulfilled.

The automated data warehouse also includes all material available to the factory as part of current supply to be used when producing a work schedule and a material delivery schedule. The automated data warehouse includes a continuously updated location of a quantity of material from the time the material is accepted into available inventory, during movements from one material source to another, throughout work-in-progress, until the time that the material is consumed.

The automated data warehouse enables current supply and demand to be determined even when manufacturing is occurring in the factory, without the need to delay manufacturing or wait until a lull when the customer orders and available inventory are static. Current supply and demand are updated continuously in the automated data warehouse so that they are available for generating a work schedule and a material delivery schedule when schedules are needed. Continuously updating measures of supply and demand from all available sources closes the loop for providing inputs for generating a work schedule and a material delivery schedule. A work schedule and a material delivery schedule are generated periodically to keep up with consumption of materials and fulfillment of customer orders using the automated data warehouse as the source of current supply and demand.

One aspect of the invention includes a method for scheduling work and delivery of material for mass-producing items in a factory. The method includes obtaining at least one outstanding customer order, wherein each outstanding customer of the at least one outstanding customer order includes an item ordered by a customer, and producing the item requires a required quantity of a required material. The method also includes determining a current state of an available inventory of at least one material from a plurality of material sources. The method also includes periodically generating a work schedule and a material delivery schedule for producing the item using the at least one outstanding customer order and the current state of the available inventory. The current state of the available inventory is determined such that the determination of the current state of the available inventory is completed immediately prior to the generating the work schedule and the material delivery schedule. The at least one outstanding customer order is obtained such that the obtaining the customer order is completed immediately prior to the generating the work schedule and the material delivery schedule.

Another aspect of the invention includes a method for scheduling work and delivery of material for mass-producing items in a factory. The method includes obtaining at least one outstanding customer order, wherein each outstanding customer of the at least one outstanding customer order includes an item ordered by a customer, and producing the item requires a required quantity of a required material. Obtaining the outstanding customer orders includes using a status for each customer order to determine the customer orders having an outstanding status. The status for each customer order is updated continuously.

The method also includes determining a current state of an available inventory of at least one material from a plurality of material sources. Determining the current state of the available inventory includes determining a material source from which each material can be obtained, an available quantity of the material at the material source, and an availability time of the available quantity of the material at the material source to each operation in the factory. The material source, available quantity, and availability times for each material are updated continuously.

The method also includes periodically generating a work schedule and a material delivery schedule for producing the item using the at least one outstanding customer order and the current state of the available inventory. Generating the work schedule and the material delivery schedule assigns at least one material source from which the required quantity of the required material can be obtained. Each assigned material source provides all or a sub-quantity of the required quantity of the required material.

The current state of the available inventory is determined such that the determination of the current state of the available inventory is completed immediately prior to the generating the work schedule and the material delivery schedule. The at least one outstanding customer order is obtained such that the obtaining the customer order is completed immediately prior to the generating the work schedule and the material delivery schedule.

The invention also includes a computer system and a computer program product for implementing the method.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

Figure 1:
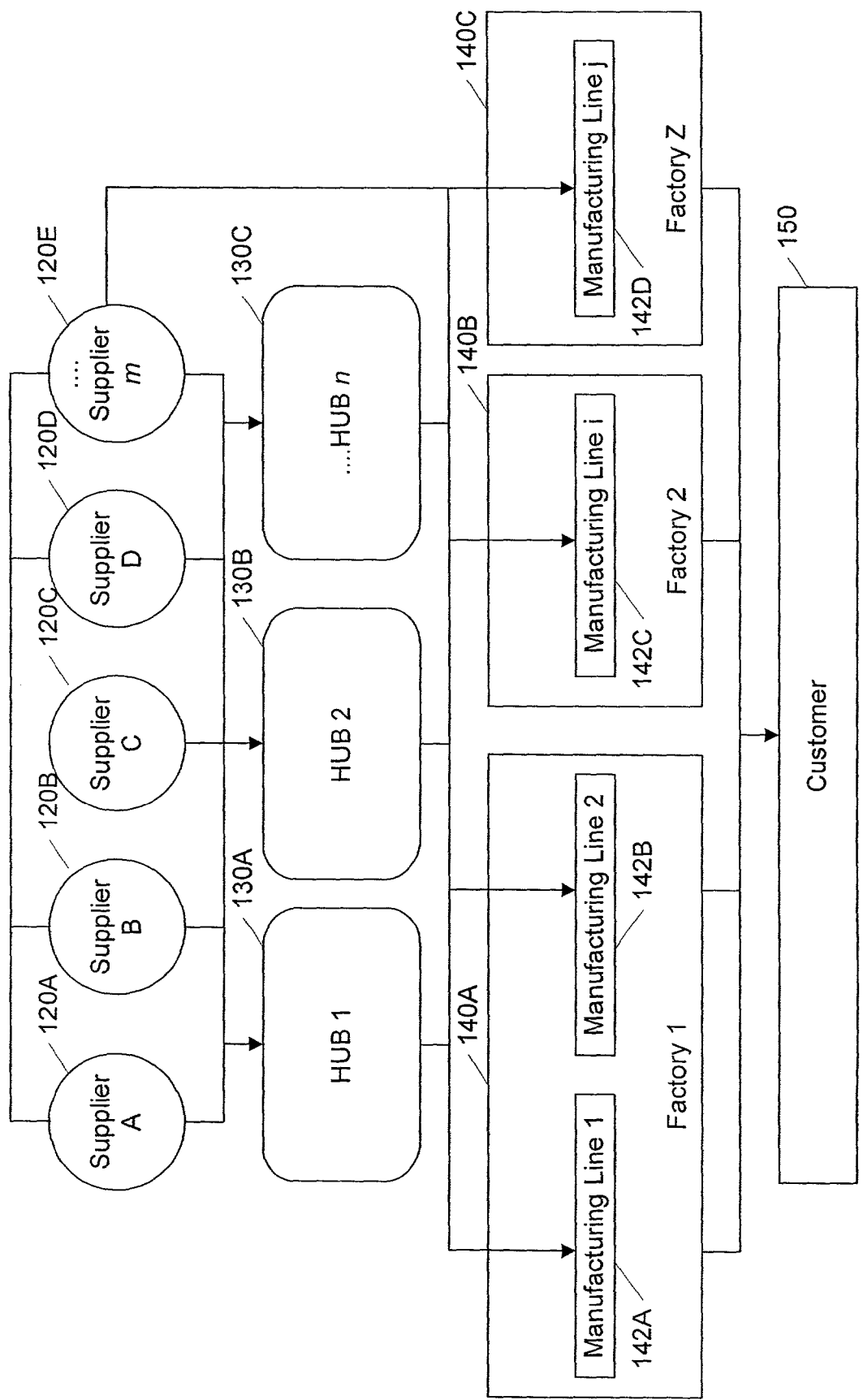
FIG. 1 is a flow diagram showing an example of a supply chain for a manufacturer having several factories.

The following is intended to provide a detailed description of an example of the invention and should not be taken to be limiting of the invention itself. Rather, any number of variations may fall within the scope of the invention which is defined in the claims following the description.

In the demand fulfillment system and method of the present invention, the inefficiencies resulting from using demand forecasts are overcome by using customer orders and the source for demand, and material availability, and material availability times to determine supply to plan work schedules and material delivery schedules for multiple operations and/or manufacturing lines of a factory.

The demand fulfillment system of the present invention considers all outstanding customer orders as a source of demand from the time the customer order is received until the customer order is fulfilled. Similarly, the demand fulfillment system of the present invention considers all available inventory of material as a source of supply, including material in-house, material that is part of work in progress on the manufacturing line, and material available from suppliers that can be delivered in sufficient time to meet production needs. Current supply and demand are updated continuously in an automated data warehouse.

When a required quantity of a material is scheduled to be used at an operation on a manufacturing line, the material is requested from the available inventory allowing sufficient time for delivery prior to the time the material is needed at the operation. When material is in transit from a transferring material source to a destination material source, the quantity of the material in transit is considered to be available as part of available inventory as of the expected arrival time at the destination material source. When the material is accepted at the destination material source, the material is removed from the in-transit inventory and added to the available inventory at the destination material source. Material is considered to be part of available inventory until the material is consumed during manufacturing or otherwise removed from the available inventory.

In the manufacturing environment described herein, a customer places a customer order for one or more products, such as a computer system. A customer may be an individual or a business entity. The product(s) are built according to the specifications provided by the customer in the customer order and may include one or more components. Generally each component is a commodity that is mass-produced and unspecialized. For example, the customer ordering a computer system product may specify several components such as a processor, monitor, printer, and so on, each of which is mass-produced. The customer order specifies the particular components to be assembled to provide the computer system product.

For simplification purposes, examples used herein may describe a customer order for a single item, wherein an item may represent either a product or a component of a product as described above. The scope of the invention is not so limited, and the invention encompasses the fulfillment of customer orders for multiple products including multiple components. A customer order therefore may include many items and/or multiple quantities of a single item. When a customer order has a single item, as in some examples herein, the assignment of a manufacturing line to fulfill the customer order by manufacturing the item is also an assignment of a manufacturing line to the customer order.

Some items may be manufactured by the manufacturer and other items may be purchased from a supplier but sold as part of a product offered to customers. For instance, the manufacturer of the computer system described above may obtain a monitor from a supplier rather than manufacture the monitor itself.

The term material is used herein to describe raw materials and/or parts used to manufacture an item. For items which are purchased from a supplier and not manufactured in-house, the term material may be used to describe the item itself.

The demand fulfillment system and method of the present invention generates a work schedule for items to be manufactured and a material delivery schedule for materials to be delivered to manufacture the items.

A work schedule includes a time and location for each item to be manufactured. The location may specify a manufacturing line and/or an operation of at least one operation on a manufacturing line to manufacture the item. A material delivery schedule identifies a material, a quantity, a material need-by time, and a delivery location (an operation and/or manufacturing line) for each material required to fulfill the work schedule. The material delivery schedule is used to ensure that materials needed to manufacture the items are delivered to the location they are needed on the manufacturing line prior to the time when manufacturing the item is to begin. The material delivery schedule is developed on a just-in-time basis so that materials are delivered to the manufacturing line just prior to the time that the material is needed for manufacturing the item.

FIG. 1 shows a supply chain for a manufacturer of items according to one embodiment of the invention. Each supplier 120 such as suppliers 120A through 120E supplies parts and/or raw materials, collectively called materials, to the manufacturer. Rather than maintaining a warehouse of materials, the manufacturer obtains materials from at least one external material source. Examples of external material sources include hub 130A, hub 130B, and hub 130C and suppliers 120A through 120E. Each hub is in close proximity to one of the manufacturer's factories, each factory being a factory 140, such as factories 140A, 140B and 140C. Each factory has at least one manufacturing line such as manufacturing lines 142A through 142D. Each manufacturing line may have one or more manufacturing operations (not shown). For factories having multiple manufacturing lines, materials from hubs and suppliers are delivered directly to the operation and/or manufacturing line that needs the material rather than to a general delivery area that serves all operations and/or manufacturing lines for the entire factory.

The term hub is used herein to describe an intermediate business that agrees with the manufacturer to maintain high levels of inventory of materials that can be delivered to the manufacturer's factory on short notice upon request. The hub makes its own arrangements with suppliers to provide material to a storage location for hub inventory. A hub may be referred to as a Supplier Logistics Center (SLC).

Suppliers may also supply parts and/or raw materials directly to the operation and/or manufacturing line upon request. In the context of the present invention, each external material source such as a hub or a supplier has its own inventory data (not shown). The manufacturer has access to the external material sources' inventory data. The manufacturer manufactures the finished products that have been ordered by customers such as customer 150.

Figure 2:
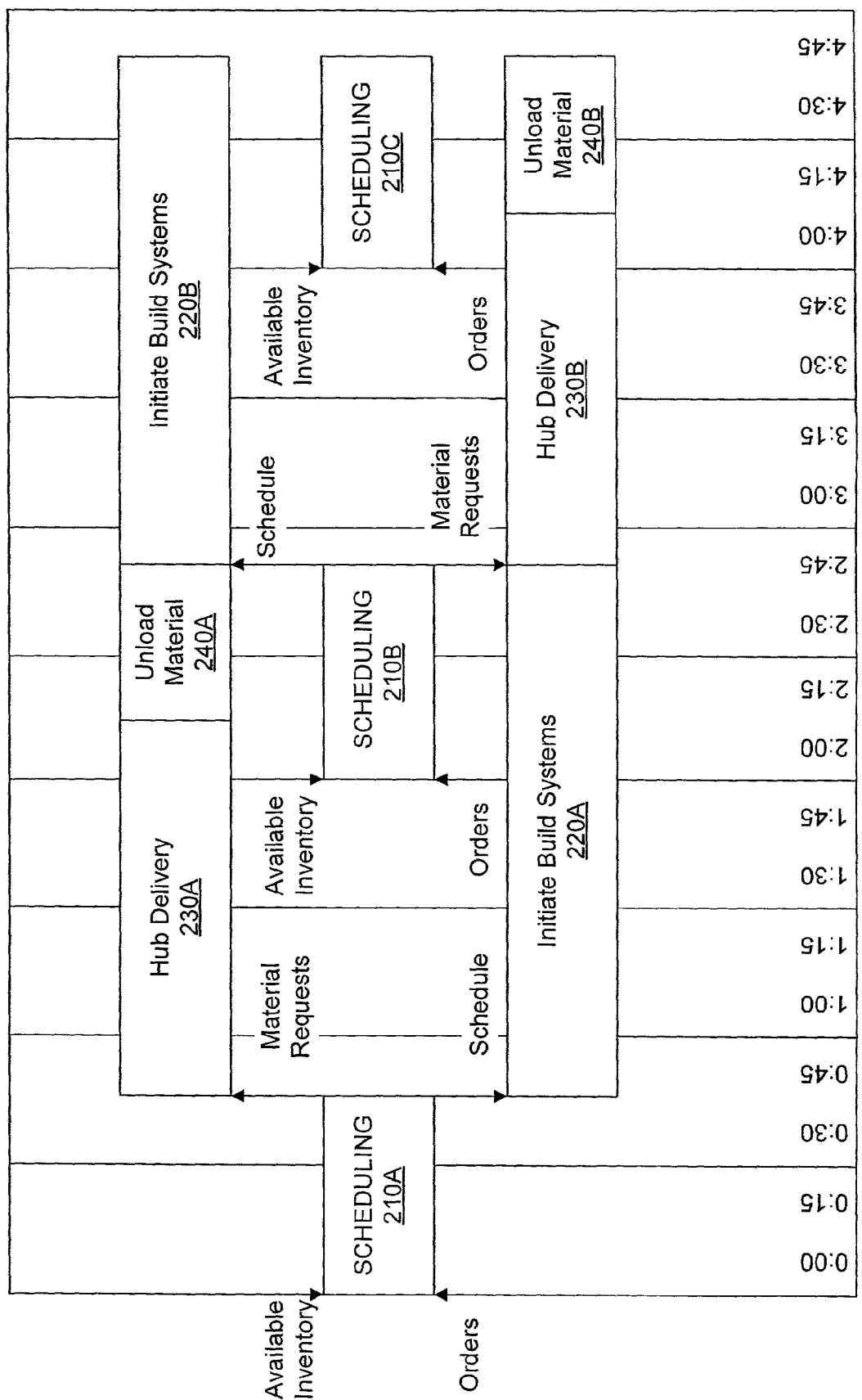
FIG. 2 shows a timeline for scheduling work and delivery of materials for a manufacturing line, receiving deliveries of material from a hub, and initiating work on the manufacturing lines according to the work schedule.

FIG. 2 shows an example of a timeline of activity on a manufacturing line according to the present invention. In this example, work is scheduled every two hours and materials are requested from a hub, an external material source. At time 0:00 shown in FIG. 2, customer orders and available inventory are provided as inputs to schedule work and deliveries of materials to the factory's operations and/or manufacturing lines.

Available inventory includes external inventory as shown in external inventory data, in this case, the hub's inventory data. Available inventory also includes in-house inventory of materials that were requested and delivered from an external material source, but that are not currently allocated to a customer order. While one of the objectives of the present invention is minimize or eliminate the need for an in-house inventory of materials, excess materials may accumulate when work is rescheduled or when excess parts are delivered by an external material source. This in-house inventory may be stored in a storage room at a manufacturing line or in an excess stock storage room.

The timeline shows three examples of scheduling blocks that occur during an example five-hour time period: scheduling block 210A beginning at time 0:00, scheduling block 210B beginning at time 2:00, and scheduling block 210C beginning at time 4:00. For illustration purposes, scheduling block 210A is shown prior to any delivery of material to the manufacturing line. Scheduling blocks 210B and 210C illustrate scheduling after some material has been delivered by hubs to the manufacturing lines. This material from hubs was requested from the hubs during the preceding scheduling block. For example, for scheduling block 210C, available inventory includes in-house inventory of materials that were requested during scheduling block 210B and delivered during hub delivery block 230B. Available inventory also includes materials available from external material sources, as shown in external inventory data.

In the example shown in FIG. 2, each scheduling block allows 45 minutes to generate a schedule. A scheduling block is constrained by the length of time that the scheduling software needs to run. In each scheduling block, such as scheduling block 210A beginning at time 0:00, a schedule is generated for all operations on all manufacturing lines using all outstanding customer orders and all available inventory. A schedule includes a work schedule for work to manufacture items in response to outstanding customer orders and constrained by material availability. A schedule identifies material requirements and may provide a material requirements schedule for materials to be used to perform the work. The work schedule identifies the items to be manufactured and a start time and location (operation and/or manufacturing line) for manufacturing each item.

The customer order identifies the materials that are needed to manufacture the item. A priority scheme may be used to assign inventory to a particular customer order to be built. For example, in one embodiment, unused in-house inventory already at the storage room for the manufacturing line assigned to the customer order receives the highest priority to be used in the next work schedule. In-house inventory stored in an excess stock storage room in the factory is given second highest priority; hub inventory is given third highest priority; and in-house inventory in a storage room for another manufacturing line is given lowest priority. This priority scheme minimizes in-house moves of materials. Other embodiments of the invention may use other methods or other priority schemes to assign materials to customer orders.

A material delivery schedule is developed from the work schedule and the manufacturing requirements so that all materials to be used in manufacturing an item are available at the operation and/or manufacturing line at the time needed for manufacturing the item. The scope of the invention includes staggered delivery of materials to the manufacturing line as items are being manufactured, as long as the material is available at the operation and/or manufacturing line when it is needed.

The present invention allows multiple scheduling blocks to occur during a single manufacturing shift. The term manufacturing shift is used herein to describe a typical manufacturing shift of approximately 8 hours during which mass production of items is continuously performed, although the number of hours in a manufacturing shift may vary. The multiple scheduling blocks produce multiple work schedules and multiple material delivery schedules for a single manufacturing line during each manufacturing shift. Scheduling work and material deliveries multiple times during the shift enables the factory to respond to changing material needs of each manufacturing line on a very short-term basis. Consider the example of FIG. 2 with a scheduling block every two hours. The schedule produced is used to initiate a work schedule after the scheduling block ends and to generate a material delivery schedule for deliveries prior to the next scheduling block, when a new material delivery schedule will be generated.

Replenishment time for material is taken into account when scheduling work. For example, if material that is needed is part of hub inventory, the work schedule must allow for the replenishment time to move the material from the hub inventory to the manufacturing line. Work using that material cannot be scheduled until after the replenishment time has passed. Replenishment time may also be needed for in-house inventory, but it should be shorter than the replenishment time needed for an external material source.

By taking account of replenishment time in scheduling work, the demand fulfillment system ensures that work is not scheduled to begin until all parts and/or materials needed for manufacturing the item are delivered to the operation and/or manufacturing line. Orders are not scheduled that cannot be completed due to missing parts.

At time 0:45, the schedule is provided to the manufacturing line and work included in the work schedule is initiated as shown in Initiate Build Systems block 220A. Also at approximately time 0:45, material requests are made in-house and externally (to the hub in this case) in preparation for the work schedule to begin in two hours. Hub Delivery block 230A and Hub Delivery block 230B show deliveries of materials from the hub in response to material requests at times 0:45 and 2:45, respectively.

The materials delivered prior to the next scheduling block are available as inventory for work to be subsequently scheduled. For example, materials that arrive prior to 2:00 are available as part of in-house inventory for scheduling block 210B. According to the present invention, material is requested so that the material received in response is available at the manufacturing line just in time for manufacturing the item. Material requests are made to ensure that a delivery of material in response to the material request is destined for a single manufacturing line.

Each scheduling block such as scheduling blocks 210A, 210B, and 210C produces another work schedule using all available customer orders and all available inventory. Initiate Build System block 220A shows initiation of the work schedule generated by scheduling block 210A, and Initiate Build System block 220B shows initiation of the work schedule generated by scheduling block 210B.

In the embodiment of the invention illustrated in FIG. 2, the work schedule is generated independently of previously generated work schedules, although other embodiments may update a previously generated work schedule. Often the work schedule generated at a given time, for example at time 0:00 including work scheduled from 2:00 to 4:00, corresponds directly to the work schedule generated two hours later, for example at 2:00, for the work scheduled for the same time period from 2:00 to 4:00. However, changes in customer orders and available inventory during the two hours between scheduling may result in differences between the two work schedules.

Unload Material block 240A and Unload Material block 240B show unloading material received from hubs or from in-house inventory at the operation and/or manufacturing line that will use the materials. Unloading materials is expected to occur according to the material delivery schedule just in time for manufacturing the item.

Figure 3:
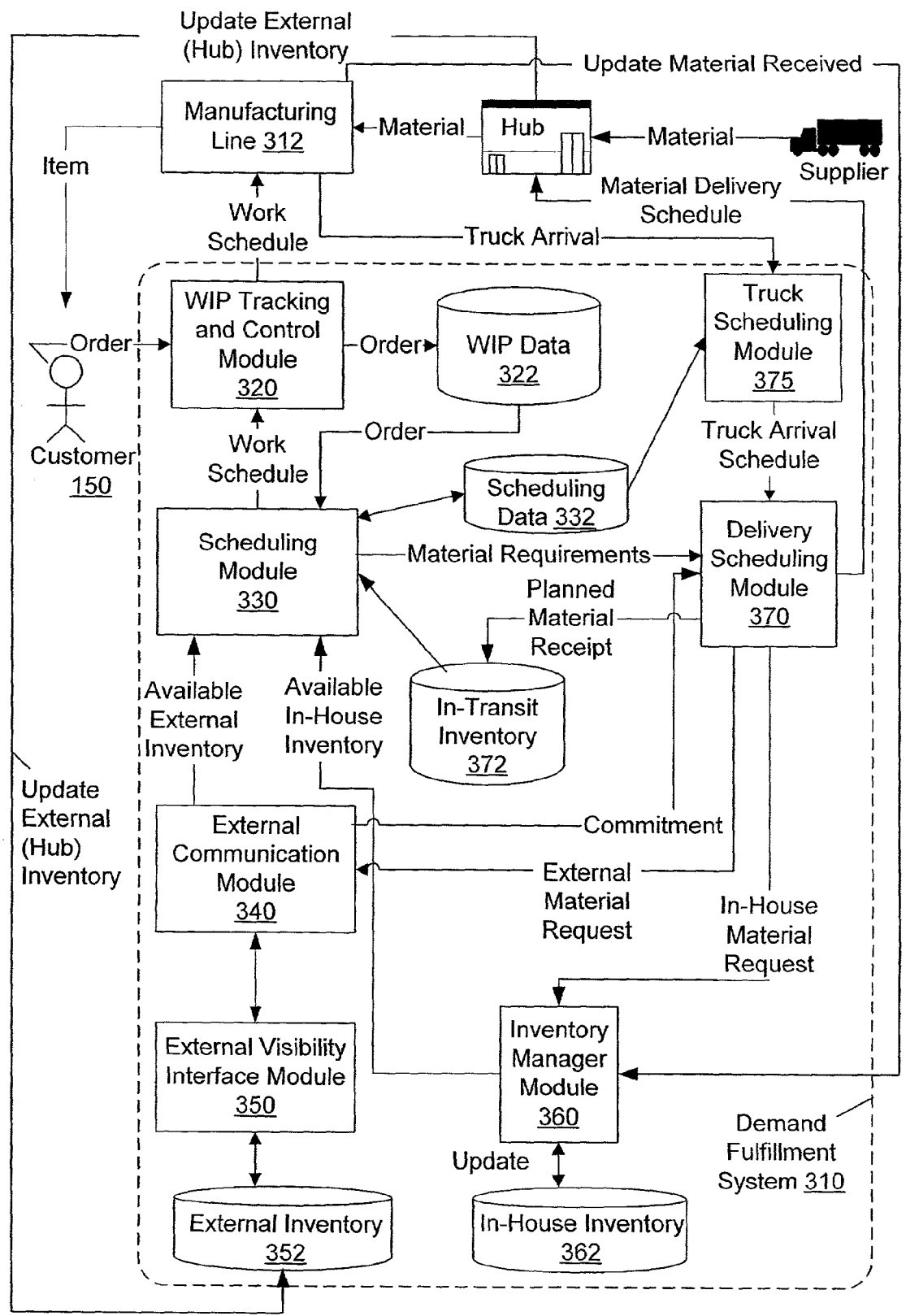
FIG. 3 shows the demand fulfillment system of the present invention and interactions between modules of the demand fulfillment system.

FIG. 3 shows demand fulfillment system 310 and interactions between modules of demand fulfillment system 310. Those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

In some embodiments, the functions of some modules of demand fulfillment system 310 may be provided by commercially available software packages. Other modules may manipulate the inputs and/or outputs as well as provide the necessary interfaces to in-house systems or external systems. For example, inputs are manipulated so that the output of the commercially available software packages is accurately based upon demand derived from customer orders, using materials available from in-house and hub inventory, and with replenishment times taken into account in scheduling work and deliveries of materials. Further manipulation of the output of the commercially available software may be necessary.

For example, in one embodiment, the functions of Scheduling module 330 are provided by i2 Factory Planner and the functions of Hub Communication module 340 are provided by i2 Rhythm Collaboration Planner. The invention is not limited to this embodiment, and the functions performed by each of these modules may be performed by modules specially developed for the demand fulfillment system, by a single module, or by other commercially available software.

In FIG. 3, a hub is used as an example of an external material source. WIP Tracking and Control module 320 controls work in progress (WIP) in the various manufacturing lines of the manufacturer, such as manufacturing line 312. When a customer 150 places a customer order, WIP Tracking and Control module 320 stores the customer order in WIP data 322 which is available to Scheduling module 330.

Scheduling module 330 develops a work schedule using the customer order and various other inputs, as will be described below. Ultimately, Scheduling module 330 provides the work schedule that is used by WIP Tracking and Control module 320 to control the operations performed on the manufacturing lines, such as manufacturing line 312. Scheduling module 330 also provides the material requirements that will be needed to perform the work schedule. Delivery Scheduling module 370 uses the material requirements to develop a material delivery schedule for delivery of materials to the operations and/or manufacturing lines.

Scheduling module 330 also compares the parts and/or raw materials needed to fulfill the customer order with available inventory to determine whether additional materials are needed to manufacture an item of the customer order. Because minimal inventory is maintained at the manufacturing lines, material requests must be issued to move materials to the manufacturing line, both from in-house inventory and from external inventory. Available external inventory and available in-house inventory comprise the available inventory that may be used to fulfill the material request. Scheduling module 330 may use and/or generate schedule data 332 to determine materials to perform certain work; for example, the material replenishment time may be used as part of identifying available inventory to fulfill the customer order.

Delivery Scheduling module 370 determines when a material request should be generated, typically at the last possible moment that will still meet a request deadline. The materials received in response to in-house material requests and external material requests are expected to be in place when the material is needed for manufacturing the item. Delivery Scheduling module 370 generates an in-house material request to Inventory Manager module 360, which manages in-house inventory, and/or an external material request such as a hub material request to External Communication module 340.

When Delivery Scheduling module 370 communicates an in-house material request, Inventory Manager module 360 obtains the available in-house inventory from In-House Inventory data 362. Inventory Manager module 360 communicates the available in-house inventory to Scheduling module 330. Available in-house inventory typically excludes in-house inventory already allocated to another customer order.

External Communication module 340 facilitates communication between the manufacturer and external delivery sources. When Delivery Scheduling module 370 communicates a hub material request, External Communication module 340 determines whether external inventory (here, hub inventory) is sufficient to meet the material request via External Visibility Interface module 350. External Visibility Interface module 350 provides an interface to external inventory data 352, which is data maintained by the external material source (the hub or supplier) rather than by the manufacturer. External Communication module 340 obtains a commitment from the external material source (here, the hub) for the amount of material the hub commits to provide to meet the material request.

External Communication module 340 communicates the available external inventory to Scheduling module 330. If an external material source cannot fulfill the entire material request, the manufacturer is automatically informed of the shortage via the commitment. The manufacturer can coordinate with the external material source to re-stock external inventory to meet demand and/or use another source.

In one embodiment of the invention, the demand fulfillment system and method also tracks in-transit inventory, also shown in FIG. 3 as in-transit inventory 372. In-transit inventory is inventory that has been committed by an external material source but not yet received at the manufacturing line. When a commitment from an external material source is received, Delivery Scheduling Module 370 uses the commitment to update in-transit inventory with a planned material receipt, thereby adding the material to in-transit inventory. In this embodiment, in-transit inventory is considered to be part of the available inventory and is used by Scheduling module 330 for scheduling work. When in-transit inventory is received at the manufacturing line, the material request is "closed" by "zeroing out" the corresponding in-transit inventory and adding the received material to in-house inventory.

Delivery Scheduling module 370 uses the material requirements generated by Scheduling module 330 and a truck arrival schedule to produce a material delivery schedule. The term truck arrival schedule is used herein to describe scheduled deliveries of available inventory to operations and/or manufacturing lines. A delivery to an operation corresponds to a delivery to an operation material source for the operation. A truck arrival schedule includes in-house deliveries from in-house inventory and/or deliveries of materials from external material sources. The term truck as used herein describes the transport mechanism used to move material from its storage location to the operation and/or manufacturing line.

A truck arrival schedule is used as input for each generation of a material delivery schedule to allow the factory to quickly adapt to changes in material needs and thus to schedule additional or fewer material deliveries.

When materials are received and/or distributed from in-house inventory, this information is entered into Inventory Manager module 360 and in-house inventory data 362 is updated. The arrival of a truck of materials is also entered into Truck Scheduling module 375, which maintains the truck arrival schedule of trucks scheduled to deliver materials from external inventory and/or in-house inventory.

By using a priority scheme to assign materials to customer orders such as that described above, the demand fulfillment system and method of the present invention are designed to ensure that in-house moves of material are rare and that in-house distribution of materials is performed as efficiently as possible. In addition, material requests are made so that each delivery of material is destined for a single operation and/or manufacturing line.

The term automated data warehouse is used to refer collectively to WIP data 322, which provides a outstanding customer orders and a current available work-in-progress inventory of materials in work in progress and not in storage; in-house inventory data 362, which provides a current available in-house inventory of materials for materials that are in stockrooms and at operations but not in work-in-progress, external inventory 352, which provides a current available external inventory at suppliers and hubs; in-transit inventory 372, which provides a current available in-transit inventory; and scheduling data 332, which provides other types of data needed to produce the work schedule and the material delivery schedule. The term current state of the available inventory includes current available work-in-progress inventory; current available in-transit inventory; current available in-house inventory, and current available external inventory. The available inventory included in the automated data warehouse is updated continuously from its respective sources. For example, WIP data 332 is updated by WIP tracking and control module continuously. In the preferred embodiment, data from each of these respective sources is updated no less than every ten minutes.

Figure 4:
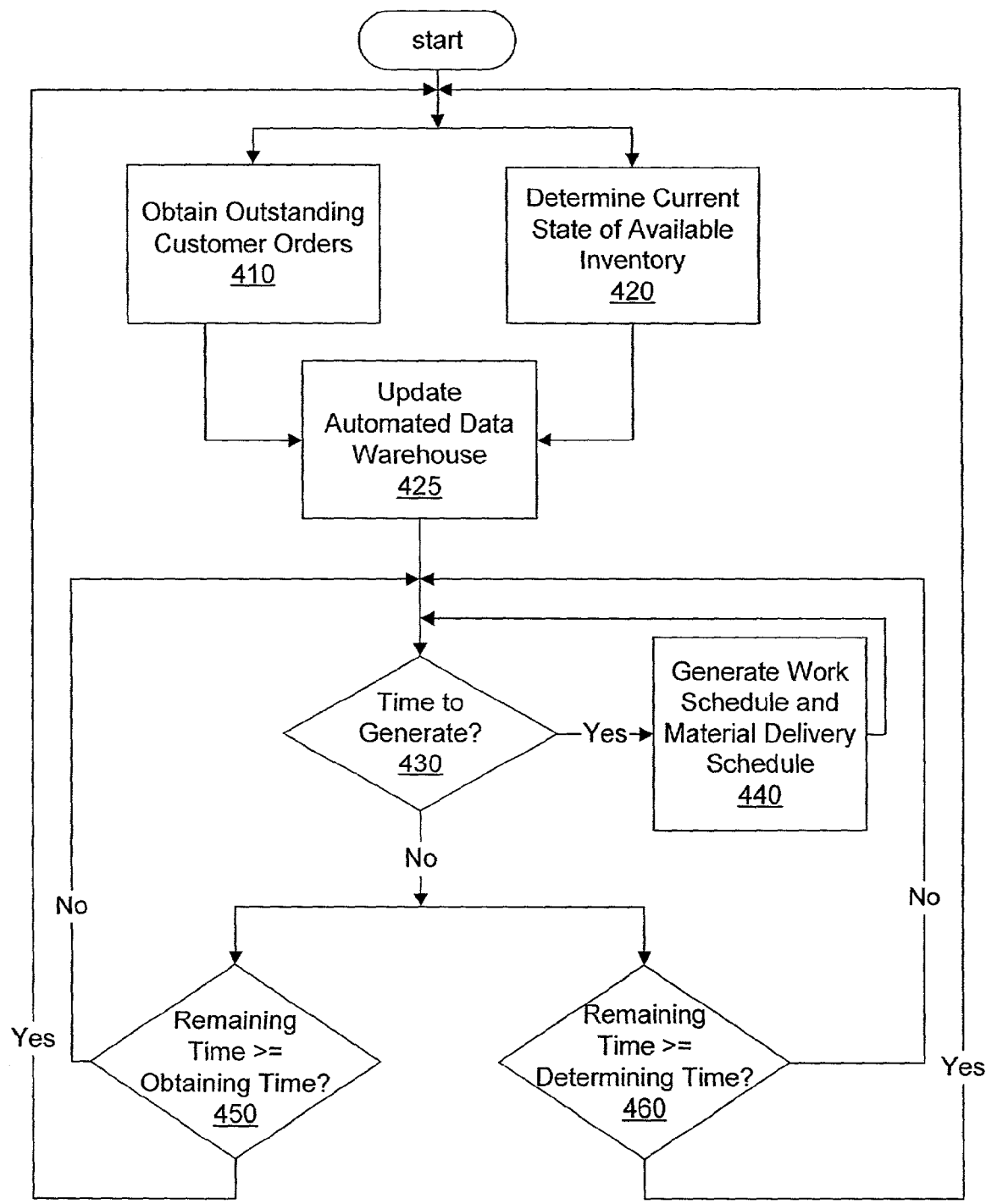
FIG. 4 shows a flowchart for obtaining the outstanding customer orders and determining the current state of the available inventory for generating the work schedule and the material delivery schedule.

FIG. 4 shows a flowchart for obtaining the outstanding customer orders and determining the current state of the available inventory for generating the work schedule and the material delivery schedule.

Steps Obtain Outstanding Customer Orders 410 and Determine Current State of Available Inventory 420 are executed simultaneously. These calculations provide the inputs of current supply and demand needed to generate an accurate work schedule and material delivery schedule. Obtaining outstanding customer orders determines demand because each outstanding customer includes an item ordered by a customer. The item has a bill of materials, and producing the item requires a required quantity of a required material. The bill of materials determines the current demand for materials.

These steps need not complete simultaneously however; whenever either step 410 or 420 completes, control transitions to Update Automated Data Warehouse step 425. Update Automated Data Warehouse step 425 posts a current snapshot of the outstanding customer orders and the current state of the available inventory to the automated data warehouse.

Control then transitions to Time to Generate step 430. In Time to Generate step 430, the method includes determining whether the time for generating the work schedule and the material delivery schedule has arrived. This time period corresponds to the scheduling blocks shown in FIG. 2, but it is not required that the time periods be equally spaced. The invention contemplates a time period between generations of the work schedule and the material delivery schedule that varies from generation to generation depending upon a variable or parameter set for the factory.

If in Time to Generate step 430, the time for generating has arrived, control transitions to Generate Work Schedule and Material Delivery Schedule step 440. The work schedule and the material delivery schedule are generated using the automated data warehouse as a source for current supply and demand. When the generation of the work schedule and the material delivery schedule is completed, control transitions to Time to Generate step 430 to determine whether the time for generating the next generation of the work schedule and the material delivery schedule has arrived.

If in Time to Generate step 430, the time for generating has not arrived, control transitions simultaneously to determine whether sufficient time remains to obtain the outstanding customer orders in Remaining Time>=Obtaining Time step 420 and to determine the current state of the available inventory in Remaining Time>=Determining Time step 440. If in Remaining Time>=Obtaining Time step 420, the time remaining prior to the next generation of the work schedule and the material delivery schedule is sufficient to obtain outstanding customer orders, control returns to step 410 and the outstanding customer orders are obtained in Obtain Outstanding Customer Orders step 410.

If in Remaining Time>=Determining Time step 460, the time remaining prior to the next generation of the work schedule and the material delivery schedule is sufficient to determine the current state of available inventory, control returns to Determine Current Available Inventory step 420.

The current state of the available inventory is determined such that the determination of the current state of the available inventory is completed immediately prior to the generating the work schedule and the material delivery schedule. The at least one outstanding customer order is obtained such that the obtaining the customer order is completed immediately prior to the generating the work schedule and the material delivery schedule.

The phrase "[performing a function] immediately prior [to an event]" is used to describe performing a function at the last possible moment such that insufficient time remains to perform the function again before the event. This phrase is used to describe determining the current state of the available inventory and obtaining outstanding customer orders, and is intended to indicate that the inputs to generating the schedules are continuously updated so that they continuously reflect current supply and demand. With a current measure of supply and demand, work and material delivery schedules are accurate and efficient, minimizing excess inventory in the factory and producing items to fulfill customer demand as quickly and efficiently as possible.

In an embodiment where the work schedule and the material delivery schedule are not generated at fixed time intervals, the time to generate can be recalculated for each generation of the work schedule and the material delivery schedule.

An advantage of the present invention is that current supply and demand are provided for scheduling work and deliveries of material to perform the work. Current supply and demand can be provided for generating the schedules when needed because the current supply and demand is continuously posted to an automated data warehouse. No delay is imposed because of the processing time necessary for providing the current supply and demand. Extensive processing time is necessary for obtaining the outstanding customer orders and determining the current state of the available inventory of material, and providing a continuously updated snapshot of these inputs enables the current supply and demand determination to be completed on an almost immediate basis.

Another advantage of the invention is that, by using current supply and demand for scheduling, in-house inventory generally will only accumulate when last-minute changes to the work schedule are made and material is unused, or when excess materials are received. For example, the manufacturer may agree with the supplier that the number of parts supplied may be the next "round number" of parts in a box or pallet. When 19 parts are requested, the supplier may provide a box of 25 parts. The excess 6 parts will be included as part of in-house inventory until they are used.

Another advantage of the invention is that it enables the factory to initiate more than one work schedule/build cycle and material delivery schedule during a given time period, such as during a manufacturing shift, without the need to maintain substantial in-house inventory of parts and/or raw materials. Manufacturing and delivery of materials are scheduled in response to customer demand rather than driven by a demand forecast or scheduled only at fixed intervals. More than one work schedule and material delivery schedule can be provided during a given time period because the automated data warehouse provides an almost immediate source of current supply and demand.

Another advantage of the invention is that it provides an accurate measure of current supply and demand that can be determined while manufacturing is ongoing. A work schedule and a material delivery schedule can be accurately generated at any time they are needed.

OOTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the described embodiment generates a schedule that reflects all outstanding customer orders and all inventory which is then analyzed to produce an work schedule and a material delivery schedule. Other embodiments may use only a subset of outstanding customer orders and available inventory to generate one or more schedules. Such variations are contemplated within the scope of the invention.

The above-described embodiments describe scheduling blocks as occurring at fixed intervals such as two hours. The scope of the invention includes scheduling blocks at other fixed time intervals as well as at variable intervals that are determined during the manufacturing process.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Consequently, the invention is intended to be limited only by the spirit and scope of the appended claims, giving full cognizance to equivalents in all respects.

What is claimed is:

1. A method for scheduling work and delivery of material for mass-producing items in a factory comprising:
    obtaining at least one outstanding customer order, wherein each outstanding customer of the at least one outstanding customer order includes an item ordered by a customer, and producing the item requires a required quantity of a required material;
    determining a current state of an available inventory of at least one material from a plurality of material sources; and
    periodically generating a work schedule and a material delivery schedule on a tangible medium for producing the item using the at least one outstanding customer order and the current state of the available inventory, wherein
        the periodically generating occurs at fixed time intervals;
        the periodically generating occurs more than once during a manufacturing shift;
        the determining the current state of the available inventory is performed such that the determining the current state of the available inventory is completed immediately prior to the generating the work schedule and the material delivery schedule; and
        the obtaining the at least one outstanding customer order is performed such that the obtaining the customer order is completed immediately prior to the generating the work schedule and the material delivery schedule.

2. The method of claim 1 wherein
the at least one outstanding customer order and the current state of the available inventory are posted continuously for the generating the work schedule and the material delivery schedule.

3. The method of claim 1 wherein
the at least one outstanding customer order and the current state of the available inventory are posted continuously to an automated data warehouse.

4. The method of claim 1 wherein the determining the current state of the available inventory includes determining for each material of the at least one material of the available inventory:
    a material source of the plurality of material sources from which the material can be obtained, wherein the material source is updated continuously;
    an available quantity of the available material at the material source, wherein the available quantity is updated continuously; and
    an availability time of the available quantity of the material at the material source to each operation of at least one operation of each manufacturing line of at least one manufacturing line of the factory, wherein the availability time is updated continuously.

5. The method of claim 1 wherein
the obtaining the at least one outstanding customer order includes using a status for each customer order of at least one customer order, wherein the status for each customer order is updated continuously; and
the status for each outstanding customer order corresponds to an outstanding status.

6. The method of claim 1 wherein
the available inventory comprises external inventory.

7. The method of claim 1 wherein
the available inventory comprises work-in-progress inventory.

8. The method of claim 1 wherein
the available inventory comprises in-transit inventory.

9. The method of claim 1 wherein
the available inventory comprises in-house inventory.

10. The method of claim 1 wherein
the periodically generating the work schedule and the material schedule includes generating the work schedule and the material delivery schedule every two hours.

11. The method of claim 1 wherein
the manufacturing shift comprises a number of hours less than or equal to eight; and
the periodically generating the work schedule and the material schedule includes generating the work schedule and the material delivery schedule a plurality of times during the manufacturing shift.

12. The method of claim 1 wherein
the plurality of material sources comprises an external material source, the external material source providing an external inventory of a first material of the at least one material of the available inventory; and
the determining the available inventory of the material includes using an external visibility interface module to determine the available inventory of the first material in the external inventory.

13. A method for scheduling work and delivery of material for mass-producing information handling systems in a factory comprising:
    obtaining a plurality of customer orders, each customer order of the plurality of customer orders including an ordered information handling system, each customer order specifying components for the a corresponding ordered information handling system, producing the information handling system ordered by the customer requiring a plurality of components, and at least one of the plurality of components varying from one ordered information handling system and another ordered information handling system based upon components specified by the customer order;
    determining a current state of an available inventory of at least one component from a plurality of component sources; and
    periodically generating a work schedule and a material delivery schedule on a tangible medium for producing the ordered information handling system using the customer order and the current state of the available inventory, wherein
        the determining the current state of the available inventory is performed such that the determining the current state of the available inventory is completed immediately prior to the generating the work schedule and the material delivery schedule; and
        the obtaining each of the plurality of customer orders is performed such that the obtaining the plurality of customer orders is completed immediately prior to the generating the work schedule and the material delivery schedule.

14. The method of claim 13 wherein
the customer order and the current state of the available inventory are posted continuously for the generating the work schedule and the material delivery schedule.

15. The method of claim 13 wherein
the customer order and the current state of the available inventory are posted continuously to an automated data warehouse.

16. The method of claim 13 wherein the determining the current state of the available inventory includes
determining a current state of the available inventory for each component of the plurality of components;
a component source of the plurality of component sources from which the component can be obtained, wherein the component source is updated continuously;
an available quantity of the available component at the component source, wherein the available quantity is updated continuously; and
an availability time of the available quantity of the component at the component source to each operation of at least one operation of each manufacturing line of at least one manufacturing line of the factory, wherein the availability time is updated continuously.

17. The method of claim 13 wherein
the obtaining the customer order includes using a status for each customer order, wherein the status for each customer order is updated continuously; and
the status for each customer order corresponds to an outstanding status.

18. The method of claim 13 wherein
the available inventory comprises external inventory.

19. The method of claim 13 wherein
the available inventory comprises work-in-progress inventory.

20. The method of claim 13 wherein
the available inventory comprises in-transit inventory.

21. The method of claim 13 wherein
the available inventory comprises in-house inventory.

22. The method of claim 13 wherein
the periodically generating the work schedule and the material schedule includes generating the work schedule and the material delivery schedule every two hours.

23. The method of claim 13 wherein
a manufacturing shift comprises a number of hours less than or equal to eight; and
the periodically generating the work schedule and the material schedule includes generating the work schedule and the material delivery schedule a plurality of times during the manufacturing shift.

24. The method of claim 13 wherein
the plurality of component sources comprises an external component source, the external component source providing an external inventory of the a first component; and
the determining the available inventory of the component includes using an external visibility interface module to determine the available inventory of the first component in the external inventory.

* * * * *